US00RE42602E

(19) United States
(12) Reissued Patent
Krywko

(10) Patent Number: US RE42,602 E
(45) Date of Reissued Patent: Aug. 9, 2011

(54) IN-EAR EARPHONE

(75) Inventor: Mark Andrew Krywko, Bradenton, FL (US)

(73) Assignee: Sleek Audio, LLC, Palmetto, FL (US)

(21) Appl. No.: 12/784,110

(22) Filed: May 20, 2010

Related U.S. Patent Documents

Reissue of:

(64) Patent No.: 7,590,258
Issued: Sep. 15, 2009
Appl. No.: 11/825,446
Filed: Jul. 5, 2007

U.S. Applications:

(60) Provisional application No. 60/818,589, filed on Jul. 5, 2006.

(51) Int. Cl.
*H04R 25/00* (2006.01)

(52) U.S. Cl. ..... 381/380; 381/328

(58) Field of Classification Search ..... 381/23.1, 381/309, 327, 328, 380
See application file for complete search history.

(56) References Cited

U.S. PATENT DOCUMENTS

| | | | | |
|---|---|---|---|---|
| RE38,351 | E | 12/2003 | Iseberg | |
| 6,931,142 | B2 * | 8/2005 | Fushimi | 381/380 |
| 7,263,195 | B2 * | 8/2007 | Harvey et al. | 381/380 |
| 7,634,099 | B2 * | 12/2009 | Harvey et al. | 381/380 |
| 2007/0189569 | A1 * | 8/2007 | Haapapuro et al. | 381/380 |

* cited by examiner

*Primary Examiner* — Brian Ensey
(74) *Attorney, Agent, or Firm* — Cantor Colburn LLP; Victor Kernus

(57) ABSTRACT

An in-ear earphone for providing high fidelity sound to the ear and having a housing with a receiver bay, at least one speaker positioned in the receiver bay, a flexible acoustical seal configured for insertion into the user's ear canal, a removable treble stem having a stepped opening therethrough configured for receipt of a filter for treble adjustment and positioned on one side of the receiver bay between the receiver bay and the acoustical seal, a cavity on the opposed side of the receiver bay remote from the stem that is configured for receiving removable plugs for bass adjustment, a strengthening and stabilizing member adapted for securing the housing around the speaker and which when optionally removable allows easy access to the speaker within the receiver bay, and a removable coaxial cable connector positioned to communicate with the receiver bay and which allows movable cable connection for user comfort.

18 Claims, 9 Drawing Sheets

FIG. 9
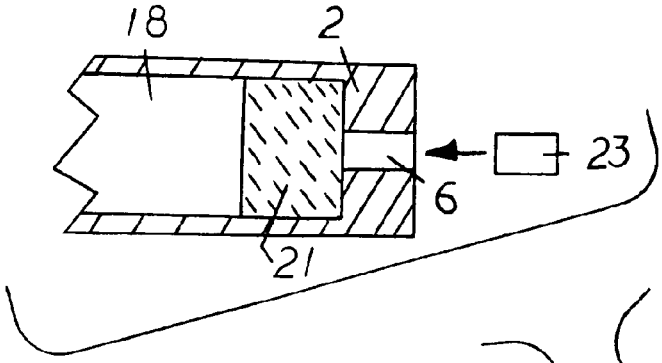
FIG. 10
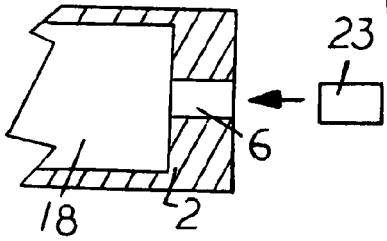
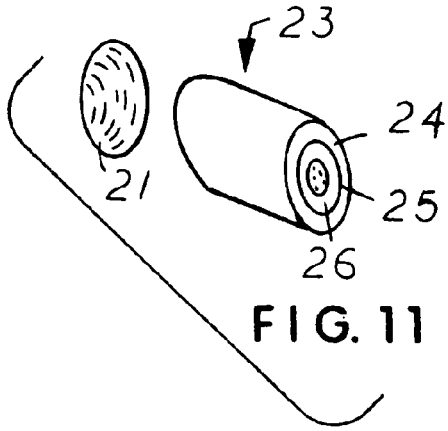
FIG. 11
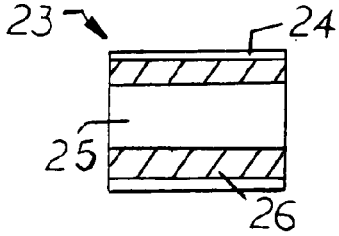
FIG. 12
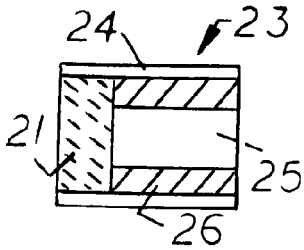
FIG. 13
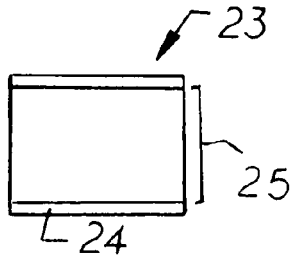
FIG. 14
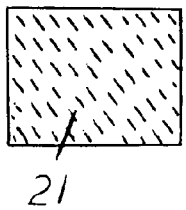
FIG. 15

IN-EAR EARPHONE

Matter enclosed in heavy brackets [ ] appears in the original patent but forms no part of this reissue specification; matter printed in italics indicates the additions made by reissue.

CROSS-REFERENCES TO RELATED APPLICATIONS

The applicant claims domestic priority for the U.S. provisional patent application 60/818,589 that he filed as a sole inventor on Jul. 5, 2006, for substantially the same subject matter, and which was entitled "In-Ear Monitor".

BACKGROUND

1. Field of the Invention

This invention relates to the field of earphones, specifically to an in-ear earphone which positions a large portion of a single armature speaker within the ear canal for improved sound quality and transmission. The housing of the present invention has a receiver bay with at least one speaker, an optionally removable member adapted for strengthening and stabilizing the housing, variable front tuning means between the receiver bay and a user's ear that is removable and adaptable for treble adjustment (also later referred to herein as the treble tip), variable rear tuning means adaptable for bass adjustment also removable and communicating with the receiver bay typically in a position remote from that of the variable front tuning means, flexible acoustic sealing means between the housing and the user's ear, and an optionally removable connector associated with the housing that is adapted for coaxial cable attachment to provide a source of sound for the speaker. Further, sound tuning and tonal quality adjustment in the present invention in-ear earphone can be optimized in a variety of alternative ways. The removable variable front tuning means (or treble tip) can comprise a variety of filter materials and configurations for optimal or desired sound tuning and tonal quality adjustment, such as but not limited to stone, fiber, ceramic, and other material capable of acoustic damping. The number and size of speakers, as well as the amount of acoustic damping material used in the present invention, would be among the factors used to determine the size of the housing and the amount of it that will fit directly within the ear canal. The size of the ear opening of the user will also be a factor in determining the amount of the present invention housing that fits into the ear canal. The removable variable rear tuning means for bass adjustment can comprise a venting cavity with one or more venting ports the size of which is determined by the application. Filter material may be used in the venting cavity, or not. In the alternative, a tuned venting cavity can be omitted, with one or more venting ports formed in the outer ear facing portion of the receiver bay and several plugs alternatively used in one or more of them that each reduce the bore size of the venting port to a different diameter dimension, to let varying amounts of air pass through the receiver bay, or block the air flow completely. Further diversification in sound tuning and tonal quality adjustment can be achieved with the use of several plugs alternatively that each include the same or different filter material and bore size reducing structure for venting port insertion whereby varying amounts of air are permitted to pass through the receiver bay for differing applications, or block the air flow completely. Applications include, but are not limited to, use with portable radios, tape players, CD players, hand-held televisions, and other sound-producing devices adapted for personal entertainment, business, and educational applications; use with hand-held music storage and listening devices; use in high fidelity products for the hard of hearing; as well as use by musicians and the aviation, medical, media, and other industries where the providing of high fidelity sound to the ear is either needed or desired.

2. Description of the Related Art

By the nature of their construction, size, and location of use, most earphones used with portable music players, such as radios and compact music storage devices, provide sound to the ear that has reduced sound quality and distortion. To those who enjoy good music, this significantly detracts from the listening experience. In contrast, the present invention is widely adaptable to user preferences, giving more bass to those who prefer it and acoustically dampening the sound in many different ways for enhanced listening pleasure.

The invention thought to be most closely related to the present invention is that disclosed in U.S. Pat. RE38,351 to Iseberg (2003). However, there are significant differences between the present invention and the Iseberg invention. Although both inventions have a housing that is acoustically sealed within an ear, the Iseberg invention is large, and thus, when it is in its usable position, its speaker is in the bowl of the ear and not the ear canal where improved sound transmission would take place. In contrast, the present invention has a much smaller dimension wherein its speaker is always placed at least in part within the ear canal. Also, the present invention has removable variable rear tuning means for bass adjustment adjacent to the outer ear end of its receiver bay, with different embodiments of the present invention having different port locations and size, varying from no venting to bores of varied size, with the optional use of plugs having filter material to block or partially block the bores, for custom sound variation according to the intended application and/or user preference. In addition and in contrast to the Iseberg invention, the present invention has a variable front tuning means or treble stem with a longitudinally-extending stepped opening for treble adjustment at the end of the receiver bay sealed within the ear canal. The Iseberg invention does not have removable treble adjustment or one with a longitudinally-extending stepped opening. Further, the present invention has the option of having a removable strengthening and stabilizing member, such as a sleeve and cap combination or a compression ring, for helping to maintain the integrity of the receiver bay during use. In the alternative, such components can be permanently fixed together during manufacture. Additionally, the coaxial cable connector in assembled embodiments of the present invention is easily releasable from the housing, and allows for fast and easy access user exchange of one color-coordinated cable for another to provide decorative enhancement according to current fashion trends and user preference. No other apparatus is known that functions in the same manner, has the same structure, or provides all of the advantages of the present invention.

BRIEF SUMMARY OF THE INVENTION

It is the primary object of this invention to provide a transmission device for improved high fidelity sound that has a reduced size which permits speaker placement within an ear canal. It is also an object of this invention to provide a sound transmission device with exchangeable parts for custom sound tuning and tonal quality adjustment of treble and bass. It is a further object of this invention to provide a sound transmission device with optional manufacture that allows sound tuning and tonal quality adjustment promptly and easily accomplished by the user. A further object of this invention is to provide a sound transmission device with structure that allows optional removal or replaceable of speakers. It is also an object of this invention to provide a sound transmission device with structure that permits selective color change and other decorative enhancement by the user. It is a further object of this invention to provide a sound transmission device with a means for allowing quick cable attachment, removal, exchange, and/or adjustment for user comfort. It is also an object of this invention to provide high fidelity in-canal sound transmission via a device that has durable construction, fits comfortably within the ear, requires little refurbishment between uses, and is cost effective to use.

The present invention, when properly made and used, will provide a transmission device with improved high fidelity sound since its receiver bay housing is sufficiently small to fit at least a portion of an associated speaker inside the ear canal. One of the factors in determining the amount of the housing and speaker that fits in the ear canal is the size of the user's ear opening. Further, variable tuning means via removable components provides custom bass and treble adjustment according to user preference. The housing of the present invention comprises a receiver bay, a removable strengthening and stabilizing member for the housing that is configured for maintaining the integrity of the receiver bay and/or retaining a speaker within it (which may be permanently attached to the housing or not), removable variable front tuning means communicating with the receiver bay and adaptable for treble adjustment, removable variable rear tuning means communicating with the receiver bay and adaptable for bass adjustment, and a cable connector (optionally removable) associated with the housing that permits easy attachment of a coaxial cable and adjustment of its orientation to optimize user comfort. The removable variable front tuning means may also contain removable filter material and the receiver bay may contain venting/tuning ports. Such ports may also be used for treble and bass adjustment, respectively, as a part of the variable front tuning means and the variable rear tuning means. When venting/tuning ports are used, plugs with or without acoustic damping material may be selectively inserted into the bore opening of any venting/tuning port to reduce the size of the bore opening, or block it completely. Also, the cable connecting means may comprise a connection cap having threaded, snap-fit, or other easy and prompt releasable connection structure that also assists in maintaining a sleeve in its preferred position of use. In addition, during its use, the housing is substantially covered with a flexible acoustical sealing means, often a two-layer acoustical seal but not limited thereto. For removal of the present invention from the ear canal, the portion of coaxial cable connected to it and extending beyond the bowl of the ear can be used for such purposes. Should a user want to exchange speakers to alter the quality and characteristics of the sound entering the ear canal, the speaker or speakers present in the receiver bay of assembled embodiments can be easily reached by separating the coaxial cable from the cable connector and removing the acoustical seal from the variable front tuning means. Once the coaxial cable and acoustic seal are both removed, the strengthening and stabilizing member (such as a sleeve, cap, compression ring, or other) can be slid or otherwise removed from the receiver bay to expose the speaker or speakers needing removal. Replacement of the strengthening and stabilizing member, acoustical seal, and coaxial cable places the present invention back into service. As one contemplated variation of the present invention in which a cap and sleeve are used, the cable connection cap, the outer coating on the attached coaxial cable, the main housing, and the sleeve can all be optionally made to have similar, complementary, or differing decorative colors and patterns that one can change out as desired for fashion coordination. Sound tuning and tonal quality adjustment in the present invention can be optimized in several ways, including the positioning of membrane or filter material within the removable front and/or rear tuning means to control the volume of air traveling through them, and/or the use of various tuning/venting bores in combination with one or more venting plugs containing bore-restricting structure, membrane or filter material, and/or a combination thereof.

The description herein provides preferred embodiments of the present invention but should not be construed as limiting its scope. For example, variations in the number and relative size dimensions of ports used in the removable variable front tuning means (or treble tip); the material from which the acoustical seal is made; the configuration, decorative enhancement, and length dimension of any sleeve used; the material from which the housing is made; the configuration of the housing; the number, size, and positioning of the venting/tuning ports used in the variable rear tuning means; the number, size, and positioning of the venting/tuning ports used in the receiver bay; and the size and materials from which any venting plugs used are made, other than those shown and described herein, may be incorporated into the present invention. Thus the scope of the present invention should be determined by the appended claims and their legal equivalents, rather than being limited to the examples given.

BRIEF DESCRIPTION OF THE DRAWINGS

FIG. 9 is a side view of a second preferred embodiment of the housing of the present invention having a single armature speaker positioned to the left of a tuned venting cavity filled with acoustic damping material, and a bore opening to the right of the tuned venting cavity, with a venting plug poised for insertion within the bore opening so that when a substantial portion of the speaker is placed within an ear canal of a user, the venting plug will provide sound tuning and tonal quality adjustment for the user.

FIG. 10 is a side view of a third preferred embodiment of the housing of the present invention having a bore opening to the right of a single armature speaker, and a venting plug poised for insertion within the bore opening so that when a substantial portion of the speaker is placed within an ear canal of a user, the venting plug will provide sound tuning and tonal quality adjustment for the user.

FIG. 11 is a perspective view of a first preferred embodiment of venting plug used with preferred embodiments of the present invention having an outer casing and bore diameter-reducing material, and being used with acoustic damping material of similar diameter dimension.

FIG. 12 is a sectional view of a second preferred embodiment of venting plug used with preferred embodiments of the present invention having an outer casing, bore diameter-reducing material, and no acoustic damping material.

FIG. 13 is a sectional view of a third preferred embodiment of venting plug used with preferred embodiments of the present invention having an outer casing, bore diameter-reducing material, and acoustic damping material on one end.

FIG. 14 is a sectional view of a fourth preferred embodiment of venting plug used with preferred embodiments of the present invention having an outer casing and no bore diameter-reducing material or acoustic damping material.

FIG. 15 is a sectional view of a fifth preferred embodiment of venting plug used with preferred embodiments of the present invention having acoustic damping material with no outer casing or no bore diameter-reducing material.

COMPONENT LIST

Figure 2:
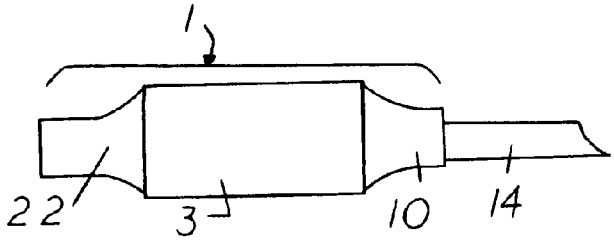
FIG. 2 is a side view of the first preferred embodiment of the present invention showing its housing comprising a receiver bay dimensioned to hold at least one single armature speaker, variable front tuning means, a removable sleeve covering the central portion of the housing and configured to hold the speaker or speakers in place, and a cable connection cap attached to the outer ear portion of the housing that is configured to hold a coaxial cable in operable association with the hidden speaker or speakers.
Figure 4:
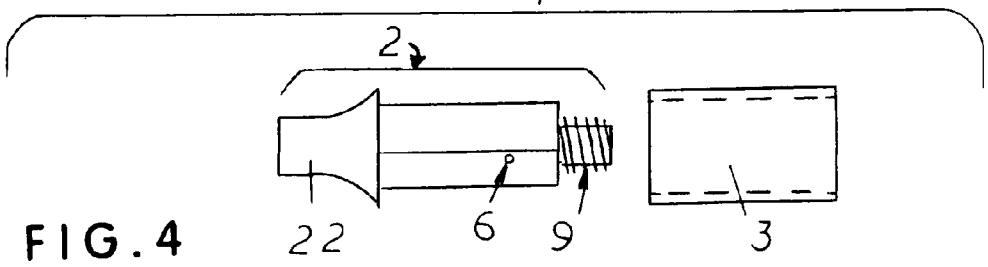
FIG. 4 is a side view of the housing assembly of the first preferred embodiment of the present invention, with its sleeve removed from the housing to reveal port venting means through the outer ear facing portion of the housing.

1—substantially cylindrical housing assembly (includes treble stem or tip 22, housing 2, sleeve 3, and removable cable connecting cap)—see FIGS. 2 and 4

2—housing embodiment with removable treble tip 22, removable coaxial cable connector 10, and a tuned venting cavity 5 for bass adjustment positioned between a receiver bay 4 and a coaxial cable connection recess 7—(see FIGS. 4-7)

3—removable sleeve—(see FIGS. 2 and 4)—used for strengthening and stabilizing housing 2, as well as access to speaker 18

4—receiver bay—(see FIGS. 5-7)—used in housing 2 to hold speaker 18

5—tuned venting cavity configured for bass adjustment—used in housing 2 to hold acoustic dampening material 21 (see FIGS. 5-7)—Sound tuning and tonal quality adjustment in the present invention can be optimized in several ways, including the positioning of membrane or filter/acoustic material within the removable front tuning means (such as #22) and/or rear tuning means (such as venting cavity #5) to control the volume of air traveling through them, and/or the use of various tuning/venting bores (such as #6) in combination with one or more venting plugs (such as #23 or #31) containing bore-restricting structure, membrane or filter material, and/or a combination thereof

Figure 5:
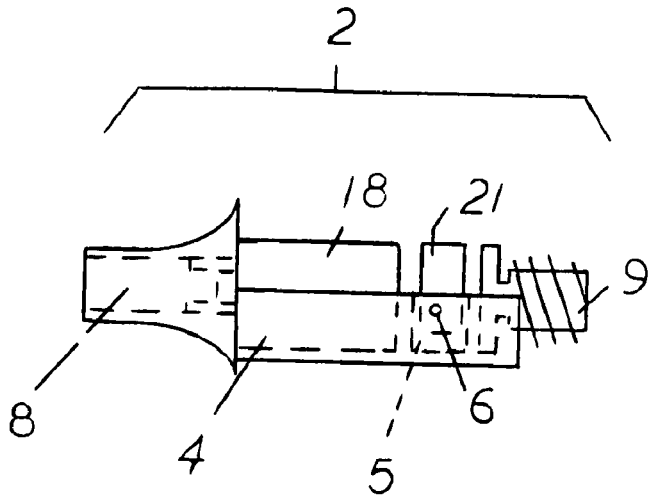
FIG. 5 is a side view of the housing in the first preferred embodiment of the present invention with a speaker positioned within its receiver bay, variable rear tuning means to the right of the receiver bay, variable front tuning means to the left of the receiver bay, and a threaded cable connecting member to the right of the variable rear tuning means.
Figure 6:
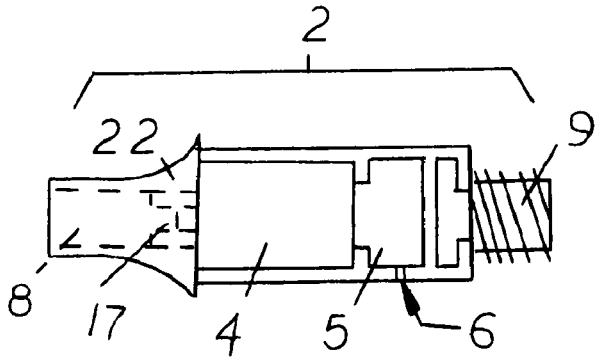
FIG. 6 is a top view of the housing in the first preferred embodiment of the present invention having a receiver bay, variable rear tuning means comprising a tuned venting cavity with variable port venting to the right of the receiver bay, a cable connection recess to the right of the tuned venting cavity and in which a threaded cable connecting member is positioned, variable front tuning means comprising a reduced diameter tuned front port to the left of the receiver bay, and the variable front tuning means also comprising a large tuned front port to the left of the reduced diameter tuned front port and positioned so that the large and reduced diameter tuned front ports together channel sound into the ear canal.

6—bass port used for bass tuning—(see FIGS. 4-6)

Figure 7:
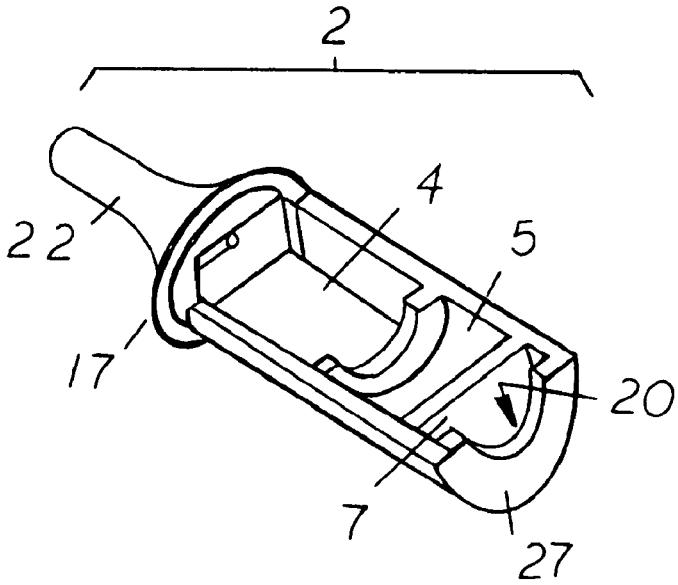
FIG. 7 is a perspective view of the housing in the first preferred embodiment of the present invention having a receiver bay, a tuned venting cavity, a cable connection recess without its threaded cable connecting member, and a reduced diameter tuned front port in communication with the receiver bay.

7—coaxial cable connection recess in housing 2—(numerically marked in FIG. 7)

8—large tuned front port in removable treble tip 22 used for treble tuning and tonal quality adjustment—(see FIGS. 5 and 6)

9—removable coaxial cable connector (can be threaded)—(see FIGS. 3-6)

Figure 3:
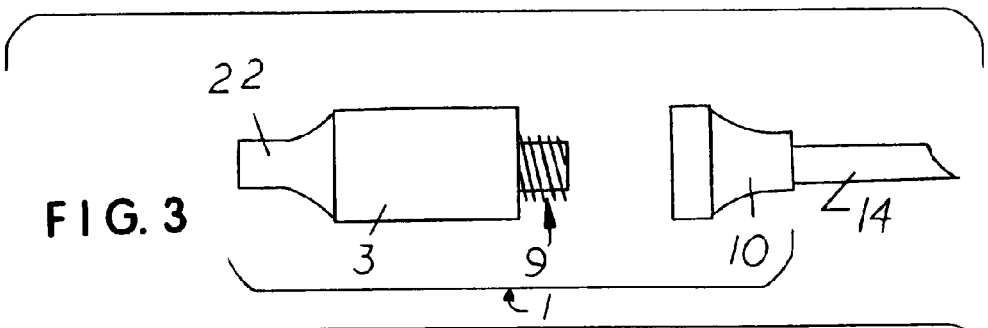
FIG. 3 is a side view of the housing assembly and coaxial cable of the first preferred embodiment of the present invention, with the housing assembly having a threaded connecting member on its outer ear end, a sleeve that covers the central portion of the housing, and a cable connection cap ready for attachment to the threaded connecting member.
Figure 8:
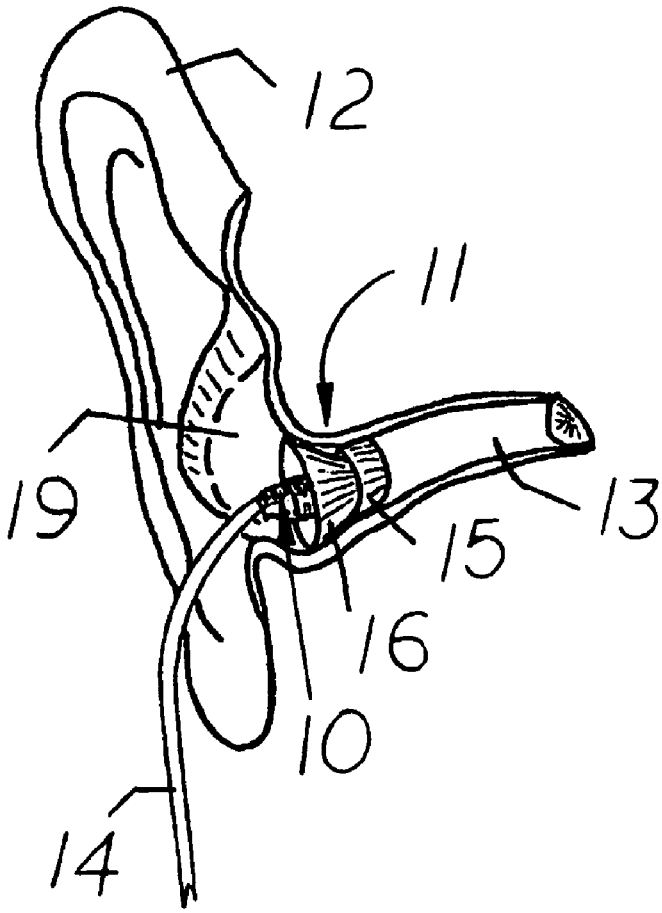
FIG. 8 is a perspective view of the first preferred embodiment of the present invention positioned within a human ear canal and having its two-layer flexible seal partially collapsed into a configuration so as to acoustically seal the ear canal, with the speaker positioned under the acoustical seal located fully within the ear canal and removable via the coaxial cable extending beyond the bowl of the ear.

10—removable cable connecting cap used to engage cable connector 9—(see FIGS. 2-3 and 8)

11—flexible acoustical seal—(preferably made from shorter outer layer 15 and longer inner layer 16)—(see FIGS. 1,8,16-18, and 23)

12—user's ear—(see FIG. 8)

13—user's ear canal—(see FIG. 8)

14—coaxial cable—(see FIGS. 1-3 and 8)

Figure 1:
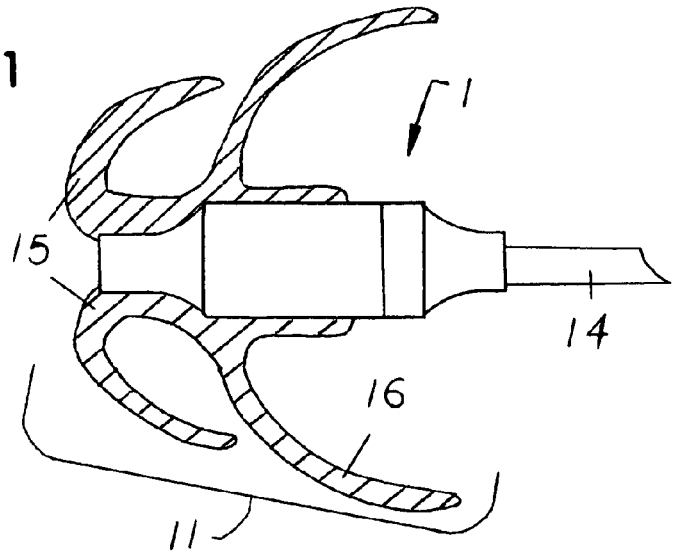
FIG. 1 is a sectional side view of a first preferred embodiment of the present invention having a two-layer acoustical seal made from resilient material that acoustically seals a substantial amount of its housing within an ear canal, as shown in FIG. 8.
Figure 23:
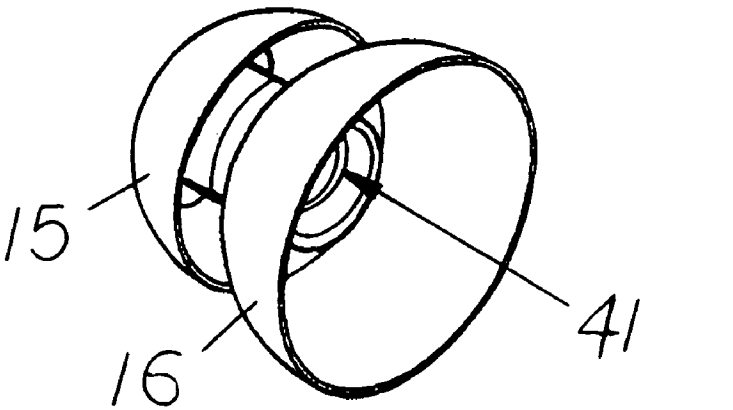
FIG. 23 is a rear view of the acoustical seal in the fourth preferred embodiment of the present invention.

15—shorter outer layer 15 of acoustical seal 11—(see FIGS. 1 and 23)

16—longer inner layer 16 of acoustical seal 11 (see FIGS. 1 and 23)

Figure 17:
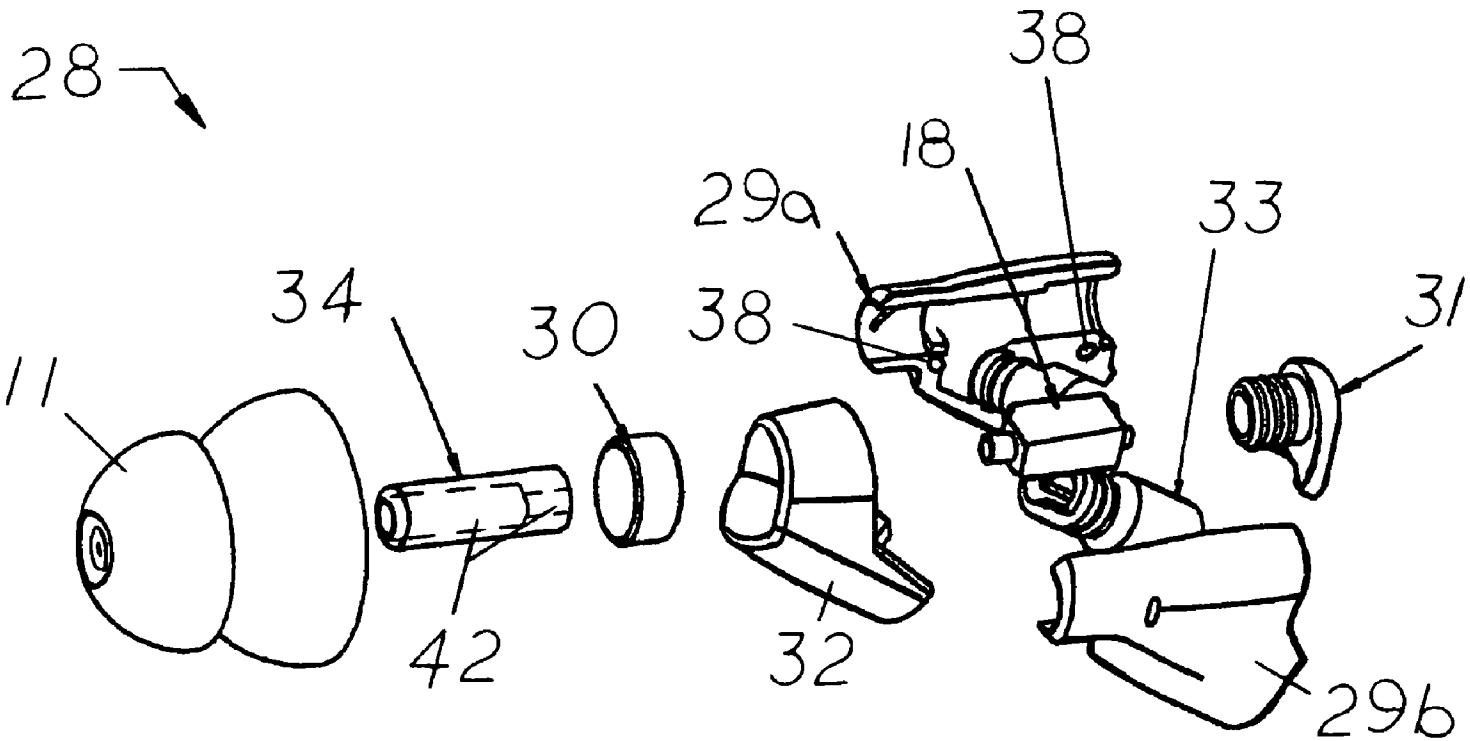
FIG. 17 is an exploded view of the fourth preferred embodiment of the present invention and includes preferred configurations for an acoustically damping filter tube, compression ring, speaker, and coaxial cable connector.
Figure 18:
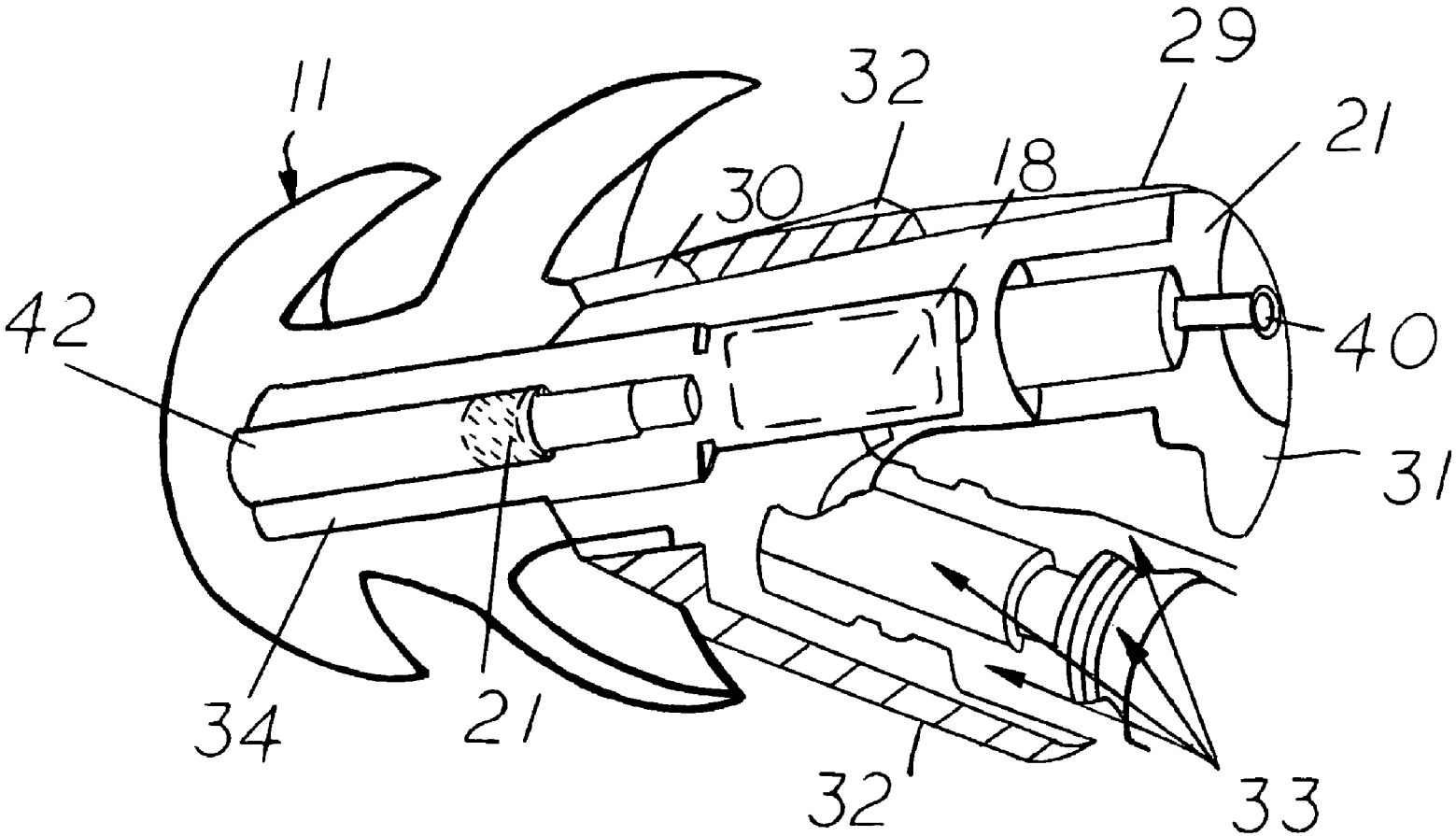
FIG. 18 is a sectional view of the fourth preferred embodiment of the present invention in an assembled configuration.

17—reduced diameter tuned front port in removable treble tip 22 used for treble tuning and tonal quality adjustment—(see FIG. 6)—in combination with large tuned front port 8, reduced diameter tuned front port 17 provides structure similar to the longitudinally-extending stepped opening 42 within the treble tip 34 shown in FIGS. 17 and 18

18—speaker—(see FIGS. 5, 17, and 18)

19—outer bowl of user's ear 12—(see FIG. 8)

20—cutout area 20 in the rear wall 27 of cable connection recess 7 (used for connecting a coaxial cable 14 to housing 2)—also referred to herein as "notch"—(see FIG. 7)

21—acoustic dampening material—(see FIG. 15)—(also referred to "filter material" and "sound filtering material")

22—removable treble tip—(also referred to as "treble stem" and "treble adjustment" and "removable variable front tuning means")—the flexible acoustical seal 11 is mounted upon removable treble tip 22—(see FIG. 1)

23—removable venting plug used for bass port tuning—(see FIGS. 9-14)

24—outer casing for bore diameter-reducing material 26—(see FIGS. 11-14)

25—bore opening—(see FIGS. 11-14)

26—diameter-reducing material that reduces the diameter of bore opening 25 so as to alter the volume of air traveling through venting port 6—(see FIGS. 11 and 12)

27—rear wall of cable connection recess 7 in housing 2—(see FIG. 7)

28—fourth preferred embodiment of the present invention having a substantially triangular-shaped housing—(see FIG. 17)

29—two-part triangular-shaped housing—(see FIG. 17)

Figure 16:
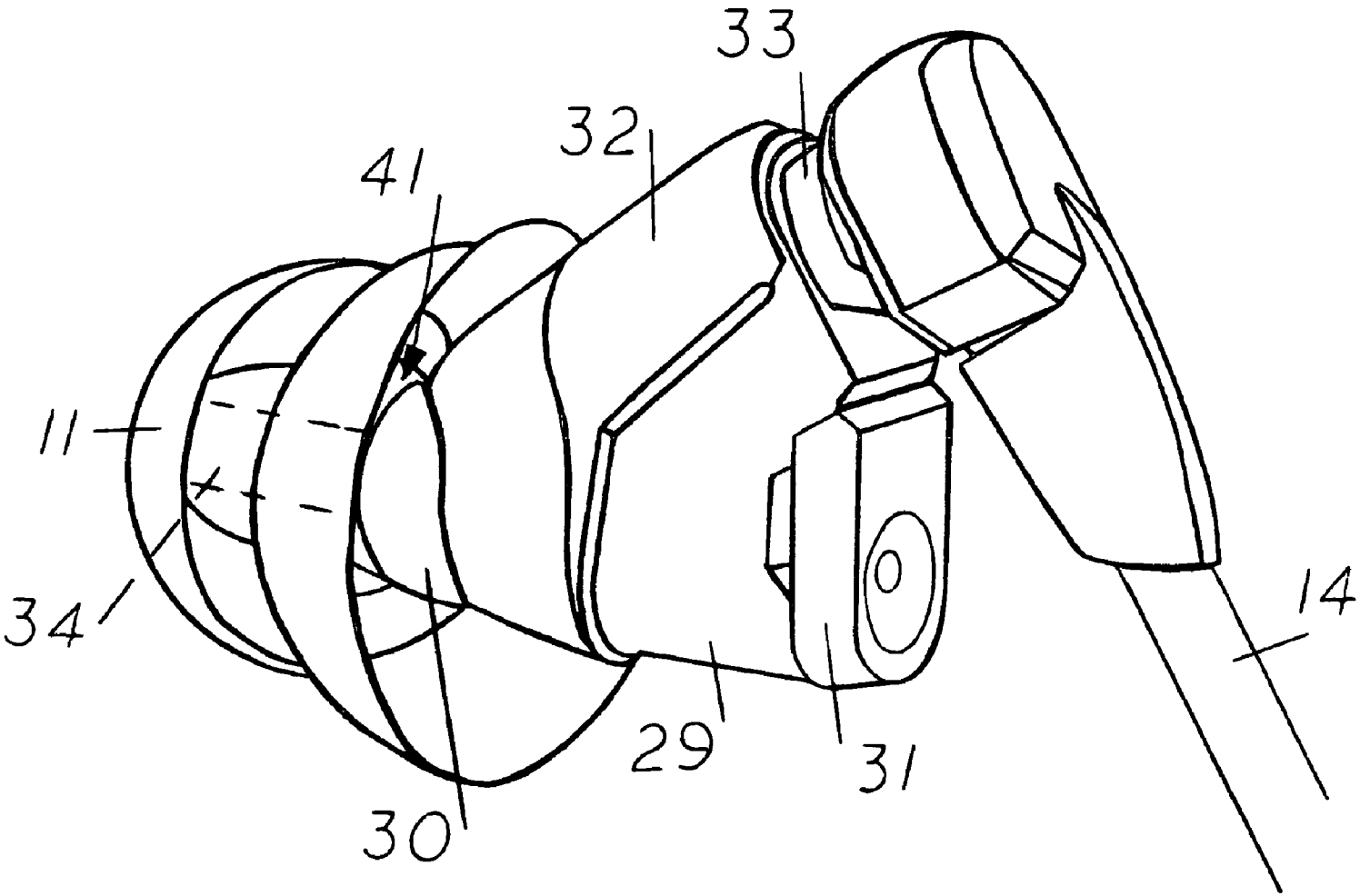
FIG. 16 is a perspective view of a fourth preferred embodiment of the present invention in an assembled configuration, and having a triangular-shaped housing and attached coaxial cable.

30—compression ring—(see FIGS. 16-18)

31—alternative configuration of removable plug usable for bass tuning in the fourth preferred embodiment 28 of the present invention—(see FIGS. 16-18 and 22)

32—decorative/angular sleeve that is usable with the two-part triangular-shaped housing 29 in the fourth preferred embodiment 28 of the present invention to strengthen and stabilize two-part triangular-shaped housing 29—(see FIGS. 16-18, 21, and 22)

33—cable connector—(allows coaxial cable 14 to be worn in a downwardly extending orientation, up over the user's ear 12, and if the user has a small ear 12 such movement permits the housing (29 or other) to be used upside down for more secure positioning during its use)—(see FIGS. 16-18)

34—configuration of a removable treble tip that is usable with the fourth preferred embodiment 28 of the present invention having two-part triangular-shaped housing 29—(see FIGS. 16-18)—the flexible acoustical seal 11 is mounted upon removable treble tip 34—also, removable treble tip 34 is one possible "removable variable front tuning means" of the present invention and provides "treble adjustment"

35—forward cavity or area (see FIG. 19) in two-part triangular-shaped housing 29 in the fourth preferred embodiment 28 of the present invention on the side of the receiver bay 4 adjacent to treble tip 34

36—rear space in two-part triangular-shaped housing 29 and which is configured for receiving removable plugs for bass adjustment (such as that marked by the number 31 in FIGS. 16-18) and/or acoustic damping material (see 21 in FIGS. 13 and 18)

Figure 19:
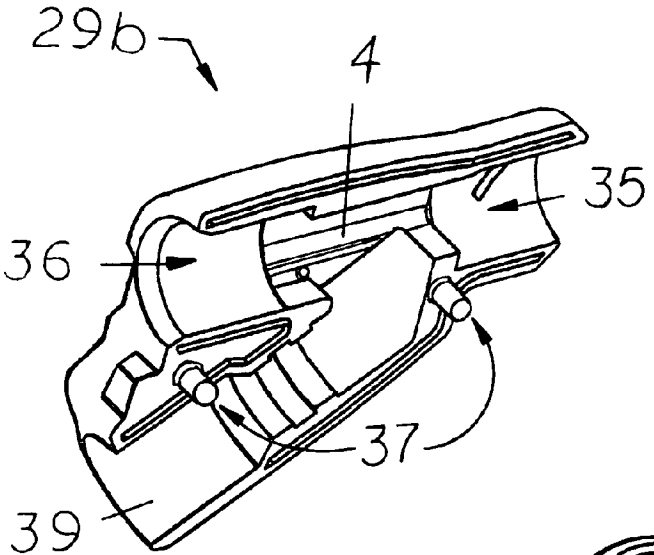
FIG. 19 is a side view of one-half of the housing in the fourth preferred embodiment of the present invention.

37—stabilizing protrusions adapted for mating with a bore 38 in the opposing half of two-part housing 29 (see FIG. 19)

38—bore adapted for mating with a stabilizing protrusions 37 in the opposing half of two-part housing 29 (see FIG. 17)

39—hollow space configured for receiving and securing cable connector 33 when it is needed between coaxial cable 14 and speaker 18 to provide sound to speaker 18—(see FIG. 19)

Figure 22:
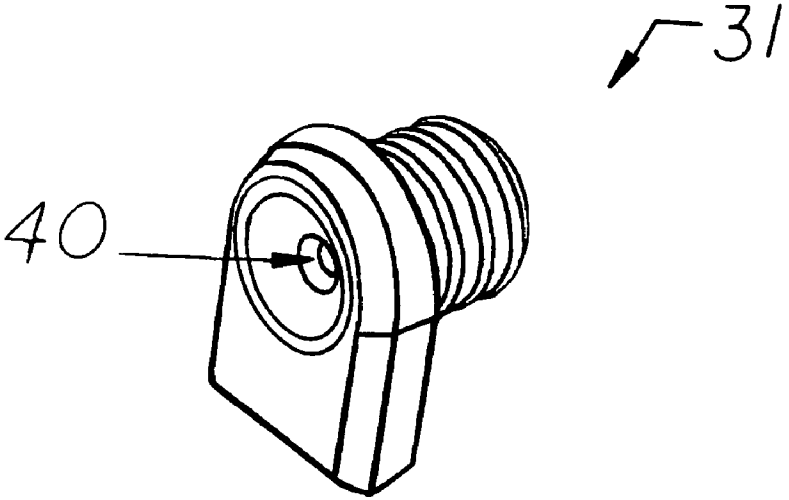
FIG. 22 is a rear view of the bass plug in the fourth preferred embodiment of the present invention.

40—an optional opening in bass port plug 31—(see FIGS. 18 and 22)

41—an inner extension of flexible acoustical seal 11 that is configured to provide a secure engagement of flexible acoustical seal 11 with removable treble tip 34—(see FIGS. 16 and 23)

42—longitudinally-extending stepped opening within removable treble tip 34—(see FIGS. 17 and 18)—similar in configuration to the space provided by large tuned front port 8 and reduced diameter tuned front port 17 in removable treble tip 22—(see FIG. 6)

DETAILED DESCRIPTION OF PREFERRED EMBODIMENTS

FIGS. 1-23 illustrate several preferred embodiments of the present invention in-ear earphone for providing high fidelity sound to the ear (shown by the number 12 in FIG. 8). Preferred embodiments shown herein have a substantially cylindrical housing assembly 1 or two-part triangular-shaped housing 29 each with a receiver bay 4, at least one speaker 18 positioned in receiver bay 4, a flexible acoustical seal 11 that is configured for insertion into the user's ear canal 13 (see FIG. 8), a removable treble stem or tip (see number 22 in FIGS. 2-4 and number 34 in FIG. 18) positioned between the receiver bay and the acoustical seal for treble adjustment with a longitudinally-extending stepped opening (see numbers 8 and 17 in FIGS. 2-4 and number 42 in FIG. 18) and optional/replaceable filter material 21 (see FIG. 18), a cavity or area (see number 35 in FIG. 19) on the opposed side of the receiver bay remote from the treble stem or tip (22, 34, or other) that is configured for receiving removable plugs (such as those marked by the number 23 in FIGS. 9 and 10 or the number 31 in FIGS. 16-18) and/or acoustic damping material (see 21 in FIGS. 13 and 18) for bass adjustment, a strengthening and stabilizing member (such as sleeve 3 in FIG. 2, angular sleeve 32 in FIG. 16, or compression ring 30 in FIG. 17), adapted for securing the housing (1, 29 or other) around the speaker or speakers 18 and which when not permanently secured in place during manufacture allows easy access to receiver bay 4, and a removable coaxial cable connector (see number 9 in FIGS. 4-6 and number 33 in FIGS. 16-18) fixed in location relative to the housing (1, 29 or other) and positioned to communicate with the receiver bay 4. Some embodiments of the present invention allow disassembly of sleeve (3, 32, or other) and cable connector (9, 33, or other) from housing (1, 29, or other) for access to speaker 18, and some embodiments of the present invention have the sleeve and cable connector components permanently attached to housing (1, 29, or other). Although the cable connector (9, 33, or other) is fixed in position relative to housing (1, 29, or other), the connection between an attached coaxial cable 14 and the present invention cable connector 33 in fourth preferred embodiment 28 is similar to the type of quick-disconnect snap-on coupling used as a part of RF connectors and permits movement of the coaxial cable 14 relative to the housing (1, 29, or other) to optimize user comfort. Thus, use of cable connector 33 allows the coaxial cable 14 to be worn in a downwardly extending orientation, up over the ear 12, and if the user has a small ear 12 such movement permits the housing (1, 29, or other) to be used upside down for more secure positioning during its use. FIGS. 1-8 show a first preferred embodiment of the present invention with a treaded cable connector 9 and a housing 2 with a tuned venting cavity 5 for bass adjustment positioned between a receiver bay 4 and a coaxial cable connection recess 7. In addition, FIGS. 9-10 show alternative embodiments of housing 2 construction and FIGS. 11-15 show several alternatively used removable venting plugs 23 that can be used in any venting port 6 or tuned front port 22 of the present invention for sound tuning and tonal quality adjustment. FIGS. 16-23 show a fourth preferred embodiment 28 of the present invention having a triangular-shaped body 29 with a narrow thickness dimension that improves fit in a human ear 12, a compression ring 30, acoustic seal 11, bass port plug 31, decorative/angular sleeve 32, and a cable connector 33. It is to be understood that the embodiments disclosed in detail herein are provided only as examples, and there are other embodiments not shown or specifically described that are also considered to be within the scope of the present invention. Thus, the claims appended herein and their legal equivalents should be used to define present invention structure.

FIGS. 1-7 show a first preferred embodiment of the present invention improved high fidelity sound transmission device, with FIG. 8 showing the first preferred embodiment of the present invention substantially inserted within an ear canal (shown by the number 12 in FIG. 8). For someone with a small ear opening, the present invention would sit a little further out into the outer bowl 19 of ear 12 than is shown in FIG. 8. The first preferred embodiment of the present invention has a housing assembly 1 (shown in FIGS. 1-3), and a coaxial cable 14 (also shown in FIGS. 1-3, and 16) that is connected between housing assembly 1 and a sound producing unit (not shown), such as but not limited to a radio or compact music storage and listening device. As shown in FIGS. 2-4, housing assembly 1 comprises a housing 2, a removable sleeve 3, and a removable cable connecting cap 10 that secures coaxial cable 14 into its preferred position of use. Although FIG. 3 shows cable connecting cap 10 positioned for attachment to a threaded cable connecting member 9, cable connecting means other than threaded means are also contemplated, including but not limited to those providing a secure snap-fit, quick-disconnect snap-on, or slip attachment connection. Further, although FIGS. 1-3 show cable 14 being attached to cable connecting cap 10 centrally from its distal end, such connection is not critical, and any distal end connection or connection through the side of cable connection cap 10 may be used, including oblique connection angles. FIGS. 4-7 show more detail about the structure of the housing 2 of the first preferred embodiment of the present invention. FIGS. 6 and 7 show housing 2 having a receiver bay 4 for at least one speaker (shown by the number 18 in FIG. 5), a cable connection recess 7, and a tuned venting cavity 5 positioned between receiver bay 4 and cable connection recess 7 and configured for receipt of varied removable bass adjustment means. For most present invention purposes, preferred speaker 18 is a single armature speaker. The sizes and configurations of receiver bay 4, cable connection recess 7, and tuned venting cavity 5 are not critical and may be different from that shown. As shown in FIGS. 4-6, housing 2 also comprises a cable connecting member or connector 9, which may be removable, or not. The first embodiment of the present invention comprises a threaded connection between housing 2 and cable connecting cap 10, which is no critical. FIGS. 4-7 also show housing 2 having a removable tuned front port 22 adjacent to receiver bay 4, with FIGS. 5-6 showing tuned front port 22 having one large tuned front port 8 and one reduced diameter tuned front port 17 (similar in configuration to the longitudinally-extending stepped opening 42 shown in FIG. 17. Although only one of each is shown, it is also contemplated for tuned front port 22 to have other large tuned front ports 8 and/or additional reduced diameter tuned front ports 17 different from the sizes and dimensions shown in FIGS. 5 and 6, as needed in specific applications. In addition, in a position remote from tuned front port 22, FIGS. 4-6 show one venting port 6 in the tuned venting cavity 5 adjacent to receiver bay 4. Although only one venting port 6 is shown, it is contemplated for more than one venting port 6 to be present. In the alternative, one or more venting ports 6 could be used in receiver bay 4. Further, the number, size, configuration, and locations of venting ports 6 may be different from that shown. Also, as shown in FIGS. 11-15, a variety of venting plugs 23 and/or filter material 21 may be used with any venting port 6, as well as with any large tuned front port 8 or reduced diameter tuned front port 17, for custom sound tuning and tonal quality adjustment according to user preference. In addition, FIG. 7 shows a cutout area 20 for use in connecting a coaxial cable 14 to housing 2. Cutout area 20 may be larger or smaller than shown, and/or have a different location or configuration, as needed to suit the application. As shown in FIG. 5, speaker 18 is positioned within receiver bay 4, with a quantity of sound filtering material 21 positioned in tuned venting cavity 5. Although the size and configuration of speaker 18 and filter material 21 can vary from that shown in FIG. 5, each should have a size and configuration that allows sleeve 3 to hold them securely in place during sound transmission use of the present invention in an ear canal (shown by the number 13 in FIG. 8). It is contemplated that housing 2 and sleeve 3 be sufficiently small for a substantial portion thereof to fit inside an ear canal 13 for enhanced sound quality. FIG. 8 shows a flexible acoustical seal 11 made from resilient material, with housing 2 and sleeve 3 hidden inside it, and a coaxial cable 14 extending from the cable connection cap 10 positioned within the outer bowl 19 of an ear 12. Although cable connection cap 10 is substantially within outer bowl 19, the shorter outer layer 15 and the longer inner layer 16 of acoustical seal 11 are substantially positioned within ear canal 13 and collapsed around housing 2 and sleeve 3 to seal them within ear canal 13. As previously mentioned, the size of the opening in a user's ear 12 may force the present invention into a different placement than is shown in FIG. 8. In contrast, FIGS. 9 and 10 show alternative embodiments of interior housing 2, with FIG. 9 showing filter material 21 between a speaker 18 and a venting port 6, and FIG. 10 showing a venting port 6 adjacent to speaker 18. In addition, FIGS. 9 and 10 both show that a removable venting plug 23 can be used in venting port 6 for user-implemented sound tuning and tonal quality adjustment. FIGS. 11-15 show variations of venting plugs 23 that can be used as a part of the present invention. FIG. 11 shows a first preferred embodiment of a venting plug 23 used with preferred embodiments of the present invention and having an outer casing 24 and bore diameter-reducing material 26 that creates a reduced diameter centrally located bore opening 25 to alter the volume of air traveling through venting port 6. Venting plug 23 can be used alone or with a separate membrane of filter material, also shown in FIG. 11. In the alternative, the membrane of filter material 21 shown in FIG. 11 can be used independently from venting plug 23 to alter the volume of air traveling through venting port 6. A separate quantity of filter material 21 other than the membrane shown in FIG. 11 can be inserted with venting plug 23 into tuned venting cavity 5. In addition, although not shown, the membrane shown in FIG. 11 could be used in addition to other independent quantities of filter material 21. Although FIG. 11 shows the membrane of filter material 21 having a similar or slightly larger diameter dimension relative to venting plug 23, other relative dimensions for filter materials 21 and venting plug 6 can be used without departing from the intended scope of the present invention. In contrast, FIG. 12 shows a second preferred embodiment of a venting plug 23 that can be used with preferred embodiments of the present invention to alter the volume of air traveling through a venting port 6. It has an outer casing 24 and bore diameter-reducing material 26 that creates a reduced diameter centrally located bore opening 25. No acoustic damping material (such as but not limited to filter material 21) is shown in FIG. 12. FIG. 13 shows a third preferred embodiment of venting plug 23 that can be used with preferred embodiments of the present invention for sound tuning and tonal quality adjustment. It has an outer casing 24, bore diameter-reducing material 26 that forms a reduced diameter centrally located bore opening 25, and a quantity of filter material 21 extending across one end of reduced diameter bore opening 25. Alternatively, FIG. 14 shows a fourth preferred embodiment of a venting plug 23 used with preferred embodiments of the present invention having only an outer casing 24 and no bore diameter-reducing material 26 or sound filtering material 21. In contrast, FIG. 15 shows a fifth preferred embodiment of a venting plug 23 that can be used with preferred embodiments of the present invention to alter the volume of air traveling through a venting port 6 wherein only filter material 21 is used, and no outer casing 24 or bore diameter-reducing material 26 present. By way of example only, and not limited thereto, filter material 21 can comprise stone, fiber, foam, mesh, plastic, ceramic or other acoustically dampening material, and bore diameter-reducing material 26 can be provided in the form of an easily installed plastic sleeve.

When the present invention is positioned within a human ear canal 13, as shown in FIG. 8, its acoustical seal 11 partially collapses into a configuration that acoustically seals ear canal 13 with the speaker 18 positioned under acoustical seal 11 and located substantially within ear canal 13. The two-layer configuration of acoustical seal 11 is not critical, and other configurations and acoustically sealing materials are contemplated to be within the scope of the present invention. In alternative embodiments not shown, speaker 18 may be substantially (but not always fully) positioned within ear canal 13. For removal of the present invention from ear canal 13, the cable 14 extending beyond the bowl 19 of ear 12 and connected to the cable connection cap 10 can be used for such purposes. Should a user want to exchange speakers 18 to alter the quality and characteristics of the sound entering ear canal 13 in assembled embodiments, or simply for inspection and/or maintenance purposes of speaker 18 or housing assembly 1, opening the present invention can be easily accomplished by unfastening cable connection cap 10 from the distal end of cable connecting member 9 (or a non-threaded connecting component having a configuration complementary to cable connecting cap 10) extending beyond the cutout area 20 in the rear wall 27 of cable connection recess 7 and removing the two-layer acoustical seal 11 from its usable position over tuned front port 22. Once connection cap 10 and acoustical seal 11 are both removed, sleeve 3 can be slid or otherwise removed from receiver bay 4 to expose speaker 18. Replacement of sleeve 3, acoustical seal 11, and cable connection cap 10 with its attached coaxial cable 14 places the present invention back into service. In contrast, opening the two-part triangular-shaped housing 29 in FIG. 16 to reach its receiver bay 4 requires the removal of acoustical seal 15, compression ring 30, angular sleeve 32, coaxial cable 14, and bass port plug 31. In the alternative, many embodiments of the present invention will have these components permanently fixed to one another, wherein access to speaker 18 would not be possible, although treble and bass adjustment with removable components would still be an option to change sound quality to the user's preference. In assembled components, coaxial cable 14 and bass port plug 31 may be removed by a user before or after removal of the acoustical seal 15, compression ring 30, and/or angular sleeve 32. The cable connection cap 10, the outer coating on the attached coaxial cable 14, the outer surface of the housing 2, and the outer surface of sleeve 3 can all be made to have similar, complementary, or differing decorative colors and patterns that one can change out as desired to make a fashion statement.

FIG. 1 shows the most preferred embodiment of the present invention having a two-layer acoustical seal 11 made from resilient material that acoustically seals a substantial amount of the housing 2 of housing assembly 1 within an ear canal 13, as shown in FIG. 8. Acoustical seal 11 is preferably made from a shorter outer layer 15 and a longer inner layer 16 that together provide a secure fit within ear canal 13, however the structure shown in FIG. 1 is representative only and not critical as long as acoustical sealing of at least a substantial portion of housing 2 within ear canal 13 is achieved. When collapsed within ear canal 13 against the outer surfaces of housing 2 and the sleeve 3, the outer layer 15 and inner layer 16 of acoustical seal 11 substantially cover housing 2 and sleeve 3 to provide cushioned positioning thereof within ear canal 13 for the comfort of the user and to prevent injury to ear canal 13 during present invention insertion or removal.

FIGS. 2, 3, and 4 show the preferred configuration of housing assembly 1 that comprises the housing shown by the number 2 in FIG. 4, a sleeve 3 that covers the central portion of housing 2 and maintains at least one single armature speaker 18 in its usable position within housing 2, and a cable connection cap 10 that secures a coaxial cable 14 between housing 2 and a sound producing device such as but not limited to a radio or a compact music storage device (not shown). In FIG. 2, sleeve 3 covers the central portion of the housing 2 (shown in FIG. 4) of main assembly 1. Further, since cable connection cap 10 covers the outer ear facing portion of housing 2, the only visible portion of housing 2 is its tuned front port means 22 which is configured for positioning within an ear canal (shown in FIG. 8 by the number 13). The attachment of cable connection cap 10 to housing 2 can be by threaded or other means, such as but not limited to a snap-fit or slip connection. However, FIG. 4 reveals for the first preferred embodiment of the present invention the attachment of cable connection cap 10 to housing 2 is by threaded means. Further, although FIGS. 1-3 show cable 14 being attached to cable connecting cap 10 centrally from its distal end, such connection is not critical, and any distal end connection or connection through the side of cable connection cap 10 may be used, including oblique connection angles. Also, the configurations and relative dimensions of tuned front port means 22, sleeve 3, and cable connection cap 10 are not limited to that shown in FIGS. 1-4 for the first preferred embodiment of the present invention, and it is contemplated for the present invention to include embodiments having other configurations and relative dimensions for the components of housing assembly 1 and housing 2. For example, although not limited thereto and not shown, housing 2 and sleeve 3 may have a generally elliptical configuration, a generally oval configuration, a flattened appearance, one or more longitudinally-extending notches or indentations, and/or one or more horizontally-extending notches or indentations. In addition, since installation and removal of acoustical seal 11, sleeve 3, and cable connection cap 10 are user friendly and can be easily and readily accomplished by a non-professional, the cable connection caps 10, coaxial cables 14, housings 2, sleeves 3, and acoustical seals 11 of the present invention can all be decoratively enhanced and exchanged at any time by the user for replacements having similar, complementary, or differing decorative colors and patterns according to user preference and/or desired aesthetic appearance. Thus, selecting different color combinations of visible present invention components can make a variety of fashion statements possible. While it is preferred for housing 2 to be sufficiently small so that most of housing 2 is positioned within a user's ear canal 13 during any period of use, when enhanced sound tuning and tonal quality adjustment dictate a larger speaker 18, more than one speaker 18, and/or more filter material 21 than is shown for the first preferred embodiment of the present invention, all of housing 2 may not fit into a user's ear canal 13. However, for high fidelity sound, it is contemplated that even if all of housing 2 does not fit into a user's ear canal 13, at least a substantial portion of it will. FIG. 3 shows housing assembly 1 and cable connection cap 10 separated from one another and a threaded connecting member exposed through the rear wall 27 (see FIG. 7) of housing 2. Coaxial cable 14 remains attached to cable connection cap 10. Sleeve 3 remains in its usable position covering the central portion of housing 2, leaving only tuned front port 22 exposed on the ear canal facing end of housing 2. FIG. 4 shows sleeve 3 removed from housing 2 to reveal port venting means through its outer ear facing portion. FIG. 4 also shows tuned front port 22 and threaded cable connecting member 9 included as components of housing 2. As previously mentioned, but sufficiently important to repeat in the description of FIGS. 2-4, the connection of cable connection cap 10 to housing 2 is not limited to use of threaded connecting member 9, and other non-threaded connecting means are also contemplated to be within the scope of the present invention.

FIGS. 5, 6, and 7 show more detailed structure of the housing 2 employed in the first preferred embodiment of the present invention. FIG. 5 shows housing 2 having with a speaker 18 positioned within its receiver bay 4, a tuned venting cavity 5 containing a quantity of filter material 21, variable port venting 6, tuned front port means 22 with a combination of reduced diameter tuned front port 17 and large tuned front port 8 that together channel sound into ear canal 13, and a threaded cable connecting member 9 within the cable connection recess 7 positioned adjacent to the outer ear facing portion of the tuned venting cavity 5. The configuration and relative size of reduced diameter tuned front port 17, large tuned front port 8, speaker 18, filter material 21, receiver bay 4, tuned venting cavity 5, cable connection recess 7, and cable connecting member 9 are not limited to that shown in FIG. 5. For example, the preferred embodiment of the present invention shown in FIG. 10 shows contrasting structure to that in FIG. 5, since the preferred embodiment in FIG. 10 has no tuned venting cavity 5, just a tuned venting port 6 through housing 2 is a position directly adjacent to speaker 18. FIGS. 6 and 7 show housing 2 having a receiver bay 4, a tuned venting cavity 5 to the right of receiver bay 4, a cable connection recess 7 to the right of tuned venting cavity 5, a reduced diameter tuned front port 17 to the left of receiver bay 4, and a large tuned front port 8 to the left of a reduced diameter tuned front port 17, with large tuned front port 8 and reduced diameter tuned front port 17 positioned so that they together channel sound into ear canal 13 when the present invention is in the usable position shown in FIG. 8. Differences between FIGS. 6 and 7 are that only FIG. 6 shows threaded cable connecting member 9 in its usable position within the cable connection recess 7 in housing 2, and a venting port 6 through tuned venting cavity 5. In contrast, only FIG. 7 shows reduced diameter tuned front port 17 opening into receiver bay 4, the rear wall 27 of cable connection recess 7, and the cutout/notch 20 through rear wall 27 that provides the secure positioning of a cable connecting member, such as but not limited to cable connecting member 9, that is needed within cable connection recess 7. FIG. 8 shows the first preferred embodiment of the present invention positioned within a human ear canal 13. The two-layer acoustical seal 11, having a shorter outer layer 15 and longer inner layer 16, is partially collapsed into a configuration that acoustically seals ear canal 13. The speaker 18 retained within housing 2 by sleeve 3 is positioned under acoustical seal 11 and located fully within ear canal 13. Housing 2 is removable from ear canal 13 via the application of a gentle withdrawing force to the portion of coaxial cable 14 extending beyond cable connection cap 10 and the bowl 19 the ear 12.

FIGS. 9 and 10 respectively show a housing 2 with filter material 21 positioned between a speaker 18 and an adjacent venting port 6, and a housing 2 with no filter material 21 positioned between a speaker 18 and its adjacent venting port 6. The arrangement in FIG. 9 is similar in function to the use of a tuned venting cavity 5 in the first preferred embodiment of the present invention disclosed in FIGS. 5-7. FIG. 9 shows the housing 2 of a preferred embodiment of the present invention a single armature speaker 18 positioned to the left of acoustic damping filter material 21, and the bore opening of a venting port 6 to the right of filter material 21. FIG. 9 also shows a venting plug 23 poised for insertion within venting port 6 so that when at least a substantial portion of speaker 18 is placed within the ear canal 13 of a user, venting plug 23 will restrict air flow past speaker 18 to provide sound tuning and tonal quality adjustment for the user. In contrast, FIG. 10 shows the housing 2 of a preferred embodiment of the present invention having the bore opening of a venting port 6 to the right of a single armature speaker 18, and a venting plug 23 poised for insertion within venting port 6 so that when at least a substantial portion of speaker 18 is placed within an ear canal 13 of a user, venting plug 23 will provide sound tuning and tonal quality adjustment for the user.

FIGS. 11-15 show examples of preferred embodiments of venting plugs 23 used with the present invention. However, it is to be understood that other embodiments of venting plugs 23 that are not shown herein can also be used as a part of the present invention. Therefore, one should consult the claims to determine the scope of the present invention, and not consider it limited to the following examples. FIG. 11 is shows a first preferred embodiment of venting plug 23 having an outer casing 24, and bore diameter-reducing material 26, and being used with acoustic damping filter material 21 of similar or slightly larger diameter dimension. Although not shown, venting plugs 23 could also contain a membrane (such as that in FIG. 11 marked by the number 21) across its central bore 25 on one or both of its ends. In contrast, FIG. 12 shows a second preferred embodiment of venting plug 23 having an outer casing 24, bore diameter-reducing material 26, a central bore 25, and no acoustic damping material 21. Further, FIG. 13 shows a third preferred embodiment of venting plug 23 having an outer casing 24, bore diameter-reducing material 26, a central bore 25, and acoustic damping filter material 21 on one end. In addition, FIG. 14 shows a fourth preferred embodiment of venting plug 23 having an outer casing 24, a large central bore 25, and no bore diameter-reducing material 26 or acoustic damping filter material 21. In contrast, FIG. 15 shows a fifth preferred embodiment of venting plug 23 used with preferred embodiments of the present invention and comprising a quantity of acoustic damping filter material 21 with no outer casing 24 and no bore diameter-reducing material 26. The materials used for outer casing 24, bore diameter-reducing material 26, and acoustic damping filter material 21 may vary as long as such materials only enhance the high fidelity sound provided by the present invention in-ear earphone, and do not diminish it in any way. For example, although not limited thereto, filter material 21 can comprise stone, fiber, foam, mesh, plastic, ceramic, or any acoustically dampening material, and bore diameter-reducing material 26 can be provided in the form of an easily installed plastic sleeve.

Figure 20:
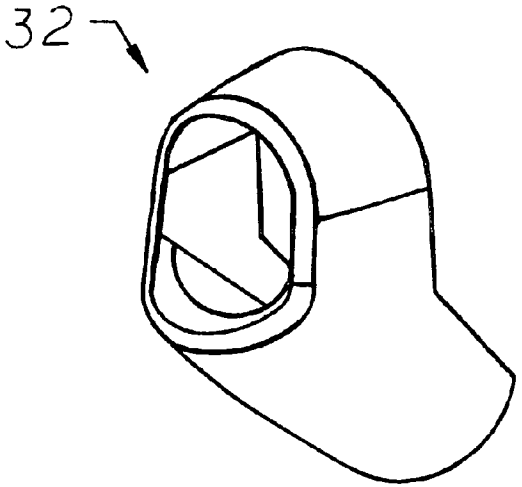
FIG. 20 is a front view of the decorative/angular sleeve in the fourth preferred embodiment of the present invention.
Figure 21:
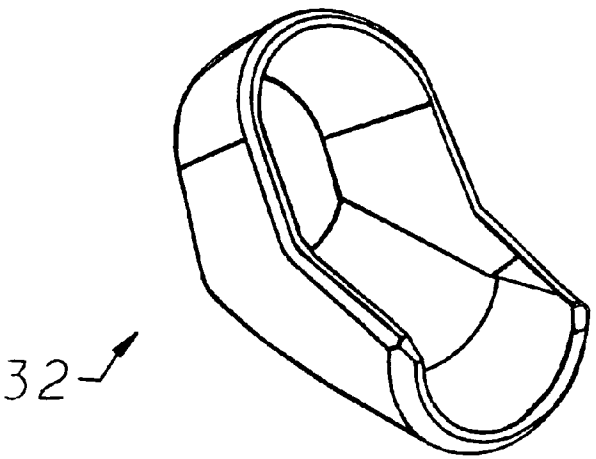
FIG. 21 is a rear view of the decorative/angular sleeve in the fourth preferred embodiment of the present invention.

FIGS. 16-23 shows a fourth preferred embodiment 28 of the present invention having a two-part triangular-shaped housing 29 with a narrow width dimension. The two parts of housing 29 (29a and 29b) may be permanently joined during manufacture, or assembled for later disassembly by a user to swap out one speaker 18 for another. Generally, it is expected for high end embodiments to allow disassembly, and more cost-effectively manufactured embodiments to have permanently joined components that do not allow access to speaker 18. Thus, for a different sound experience, instead of swapping out speakers 18 in the same housing 29, one would simply purchase a second lower cost present invention embodiment with a speaker 18 having different sound capabilities. The decorative/angular sleeve 32 in fourth preferred embodiment 28 is mainly decorative, as compression ring 30 in assembled embodiments is used to maintain the integrity of receiver bay 4. FIG. 16 is a perspective view of fourth preferred embodiment 29 in an assembled configuration and shows a coaxial cable 14 attached to a cable connector 33 depending from two-part triangular-shaped housing 29 in a position remote from acoustical seal 11. FIG. 16 also shows the removable bass port plug 31 associated with two-part triangular-shaped housing 29 for bass adjustment. FIG. 17 is an exploded view of fourth preferred embodiment 28 and includes configurations for a preferred acoustically damping filter tube 34, compression ring 30, speaker 18, and coaxial cable connector 33. In contrast, FIG. 18 is a sectional view of the fourth preferred embodiment 28 of the present invention in an assembled configuration, and shows cable connector 33, filter tube 34, speaker 18, and bass port plug 31 in their preferred positions of use. FIG. 19 shows one-half of the housing (29b) in fourth preferred embodiment 28, and the preferred longitudinally-aligned locations of receiver bay 4, the front space 35 into which a portion of the removable treble stem or tip 34 used (as the variable front tuning means of preferred embodiment 28) for treble adjustment is positioned adjacent to speaker 18, and the rear space 36 used for bass adjustment with various removable plugs and acoustical damping material. FIG. 19 also shows stabilizing protrusions 37 adapted for mating with the bores 38 shown in FIG. 17 in the other half of two-part housing 29a, and hollow space 39 configured for receiving and securing cable connector 33 while it is needed between coaxial cable 14 and speaker 18 to provide sound to speaker 18, with hollow space 39 forming an oblique angle relative to the substantially longitudinally aligned front space 35, receiver bay 4, and rear space 36. In embodiments of the present invention where the two halves of housing 29 are permanently joined together, cable connector 33 would not be removable from housing 29. FIGS. 20 and 21 respectively show front and rear views of the preferred configuration of decorative/angular sleeve 32, while FIG. 22 shows a rear view of the preferred configuration of snap-fit bass port plug 31, and FIG. 23 shows a rear view of the most preferred configuration of acoustical seal 11 with its two layers 15 and 16 of resilient material. In FIG. 22, the number 40 designates an optional opening in bass port plug 31 which can be different in size from than shown in FIG. 22. Also, in FIG. 23 the number 41 designates an inner extension configured for secure engagement with treble tip or stem 34. Although not critical, it is contemplated in fourth preferred embodiment 28 for extension 41 to abut the adjacent edge of compression ring 30. The materials used for bass port plug 31 and decorative/sleeve 32 can be the same of different from one another. Also, the material used for decorative/sleeve 32 can be the same or different from that used for housing 29.

I claim:

1. An in-ear earphone for providing high fidelity sound to the ear of a user, said earphone comprising:

a housing having opposed ends and a receiver bay situated between said opposed ends, with one of said opposed ends being a front end that is *configured and disposed to be* inserted [first] into a user's ear canal and the other of said opposed ends being a rear end;

at least one [single armature] speaker positioned in said receiver bay;

*a* first *removable* sound adjustment means adapted for user-executed acoustical treble tuning of sound produced by said [single armature] *at least one* speaker [as a result of changes made in the volume of air passing therethrough, said first sound adjustment means removably associated with said front end of said housing];

*a second removable sound adjustment means adapted for bass tuning positioned adjacent to and communicating with the other of said opposed ends of the housing;* flexible acoustical sealing means adapted for insertion into a user's ear canal[, said flexible acoustical sealing means also positioned for detachable support at least in part upon said first sound adjustment means, said flexible acoustical sealing means further configured so that when flexible acoustical sealing means is supported by said first sound adjustment means and said first sound adjustment means becomes disassociated from said housing, said flexible acoustical sealing means also becomes disassociated from said housing]; and a coaxial cable connector associated with said housing and positioned to communicate with said *at least one* speaker in said receiver bay [so that when a coaxial cable is attached to said connector and transmits a signal to said speaker, a user may periodically and repeatedly employ said first removable sound adjustment means to customize the treble portion of the sound created by said speaker according to user preference], *the coaxial cable connector being configured and disposed to selectively removably receive a coaxial cable, the coaxial cable connector being selected from a group consisting of threaded connectors and connectors having a snap-fit connection for securing a coaxial cable thereto, the coaxial cable connector permitting swiveling movement of the coaxial cable relative to said housing.*

2. The earphone of claim 1 wherein said first removable sound adjustment means is a treble tip comprising a longitudinally-extending stepped opening.

3. The earphone of claim 2 further comprising a quantity of filter material within at least a portion of said longitudinally-extending stepped opening.

4. The earphone of claim 1 wherein said housing configuration is selected from a group consisting of triangular-shaped housings, triangular-shaped housings having a narrow thickness dimension, housings having at least two parts, and cylindrical housings.

5. The earphone of claim 1 further comprising at least one easily removable strengthening and stabilizing member adapted for securing said housing in a position of use around said at least one [single armature] speaker and which when removed allows user access to said receiver bay.

6. The earphone of claim 5 wherein said at least one strengthening and stabilizing member is selected from a group consisting of sleeves, angular sleeves, decorative sleeves, and compression rings.

[7. The earphone of claim 1 wherein said coaxial cable connector is selected from a group consisting of threaded connectors and connectors having a snap-fit connection of a coaxial cable thereto that also permits swiveling movement of the coaxial cable relative to said housing.]

[8. The earphone of claim 1 further comprising second removable sound adjustment means adapted for bass tuning.]

9. The earphone of claim [8] *1* wherein said second removable sound adjustment means comprises at least one venting port.

10. The earphone of claim 9 wherein said second removable sound adjustment means further comprises at least one removable plug configured for sealing said at least one venting port.

11. The earphone of claim 10 wherein said at least one removable plug further comprises materials selected from acoustical damping material and filter material.

[12. The earphone of claim 1 wherein said coaxial cable connector is removable from said housing.]

13. The earphone of claim [8] *1* wherein said second removable sound adjustment means further comprises filter material adapted for altering the flow of air through said at least one venting port.

14. The earphone of claim [8] *1* wherein said second removable sound adjustment means comprises at least one venting cavity in close association with said receiver bay.

15. The earphone of claim 14 wherein said at least one venting cavity is configured hold acoustic dampening material.

16. The earphone of claim 15 wherein said housing is configured for easy user access to said at least one venting cavity for acoustic dampening material exchange.

17. The earphone of claim 1 wherein said second removable sound adjustment means comprises at least one venting cavity and at least one venting port.

18. The earphone of claim 1 further comprising second removable sound adjustment means adapted for bass tuning that is in close association with said rear end of said housing.

19. The earphone of claim 18 with said first removable sound adjustment means and said second removable sound adjustment means substantially longitudinally aligned.

20. The earphone of claim 19 wherein said coaxial cable connector associated with said housing forms an oblique angle with said substantially longitudinally aligned first removable sound adjustment means and said second removable sound adjustment means.

*21. The earphone of claim 1, wherein the at least one speaker is a single armature speaker.*

* * * * *